US010928305B2

(12) United States Patent
Peumans et al.

(10) Patent No.: US 10,928,305 B2
(45) Date of Patent: Feb. 23, 2021

(54) MODULATION OF LUMINESCENT DYES

(71) Applicant: IMEC VZW, Leuven (BE)

(72) Inventors: Peter Peumans, Herfelingen (BE);
Liesbet Lagae, Leuven (BE); Willem Van Roy, Bierbeek (BE); Tim Stakenborg, Heverlee (BE); Pol Van Dorpe, Spalbeek (BE)

(73) Assignee: IMEC VZW, Leuven (BE)

( * ) Notice: Subject to any disclaimer, the term of this patent is extended or adjusted under 35 U.S.C. 154(b) by 63 days.

(21) Appl. No.: 15/736,399

(22) PCT Filed: Jun. 30, 2016

(86) PCT No.: PCT/EP2016/065232
§ 371 (c)(1),
(2) Date: Dec. 14, 2017

(87) PCT Pub. No.: WO2017/001536
PCT Pub. Date: Jan. 5, 2017

(65) Prior Publication Data
US 2018/0188156 A1 Jul. 5, 2018

(30) Foreign Application Priority Data
Jun. 30, 2015 (EP) ..................... 15174675

(51) Int. Cl.
*G01N 21/17* (2006.01)
*G01N 21/64* (2006.01)

(52) U.S. Cl.
CPC ....... *G01N 21/1717* (2013.01); *G01N 21/645* (2013.01); *G01N 21/648* (2013.01); *G01N 2021/1731* (2013.01)

(58) Field of Classification Search
None
See application file for complete search history.

(56) References Cited

U.S. PATENT DOCUMENTS

| 2005/0008253 A1 | 1/2005 | Rozgonyi | |
| 2005/0048599 A1* | 3/2005 | Goldberg | ........... B82Y 5/00 |
| | | | 435/34 |

(Continued)

OTHER PUBLICATIONS

PCT Search Report and Written Opinion, PCT International Application No. PCT/EP2016/065232, dated Oct. 12, 2016, 13 pages.

(Continued)

*Primary Examiner* — Rebecca M Giere
(74) *Attorney, Agent, or Firm* — McDonnell Boehnen Hulbert & Berghoff LLP

(57) ABSTRACT

A sensor device for quantifying luminescent targets comprises a light source, a detector, a modulator, and a processor. The light source is adapted for exciting the luminescent target. The detector is adapted for detecting the luminescence of the luminescent target resulting in a measured signal which comprises a desired signal originating from the luminescent target and a background signal. The modulator is adapted for modulating a physical parameter resulting in a modulation of the desired signal which is different from the modulation of the background signal. The processor is configured to correlate the modulation of the physical parameter with the modulation of the desired signal and/or the modulation of the background signal.

19 Claims, 9 Drawing Sheets

(56) References Cited

U.S. PATENT DOCUMENTS

2010/0041166 A1     2/2010  Arie et al.
2010/0267165 A1    10/2010  Bruls et al.
2011/0278471 A1*   11/2011  Hoshishima ....... G01N 15/1429
                                                        250/459.1
2014/0154813 A1     6/2014  Decoux et al.

OTHER PUBLICATIONS

Danielli, Amos et al., "Detection of Fluorescent-Labeled Probes at Sub-Picomolar Concentration by Magnetic Modulation", Optics Express, vol. 16, No. 23, Nov. 10, 2008, pp. 19253-19259.

* cited by examiner

MODULATION OF LUMINESCENT DYES

CROSS-REFERENCE TO RELATED APPLICATION

The present application is a national stage entry of PCT/EP2016/065232 filed Jun. 30, 2016, which claims priority to European Patent Application No. 15174675.7 filed Jun. 30, 2015, the contents of which are hereby incorporated by reference.

FIELD OF THE DISCLOSURE

The present disclosure relates to the field of sensors, more particularly for instance biosensors. More specifically it relates to sensors making use of luminescence for quantifying a component in a solution.

BACKGROUND

Affinity based bio-sensors use an affinity probe which specifically binds to a target molecule. The target molecule is the molecule which comprises or consists of the analyte molecule that needs to be quantified. In affinity based bio-sensors the binding event is detected by a transduction scheme. This can be a direct detection of the binding event (e.g. in a label free sensor), or it may be an indirect chain of interactions that can be detected. In the last case a second probe with a label allows to obtain e.g. an optical or electrochemical signal representative for the amount of analyte being present. The label may for example be a fluorophore or an enzyme that catalyzes still another reaction that for example provides an optical or electrochemical signal.

In affinity based bio-sensors with fluorescence signal transduction, a bulk sample is sent over a surface, and the target molecule (analyte) is bound by an affinity probe on the surface. The presence of target molecules on the surface is thereby correlated with the presence of labels on the surface. These labels may for example be fluorescent. In such bio-sensors the fluorescent light is captured and its intensity is a measure for the amount of analyte molecules present in the original bulk sample. The affinity probe may for example be an antibody, an antigen, an aptamer, complementary DNA or a molecularly imprinted surface. In the affinity based fluorescent bio-sensor with evanescent excitation fluorescence, total internal reflection may be used to create an evanescent field very close to the sensor surface, to excite only those fluorophores which are present very close to the surface, and of a large fraction of which can be expected that they are bound to an affinity probe on the surface.

Despite the already existing affinity based sensors there is still room for building improved affinity based sensors.

SUMMARY

It is an object of embodiments of the present disclosure to provide optical detection systems with a good, e.g. an improved, signal to noise ratio. It is an objective of embodiments of the present disclosure to be able to separate the desired signal from background signal(s).

The above objective is accomplished by a method and device according to embodiments of the present disclosure.

In a first aspect, the present disclosure provides a sensor device for quantifying luminescent targets, wherein the device comprises:

a light source for exciting the luminescent targets, thus generating luminescence signals, and a detector for detecting the luminescence signals of the luminescent targets, resulting in a detected signal which comprises a desired signal originating from the luminescent targets and a background signal, and a modulator for modulating a physical parameter resulting in a modulation of the desired signal which is different from the modulation of the background signal, and a processor configured to correlate the modulation of the physical parameter with the modulation of the desired signal and/or the modulation of the background signal, so as to generate a measurement signal representative for the quantification of luminescent targets.

In example embodiments of the present disclosure, the desired signal can be separated from the background signal by modulating a physical parameter which influences the luminescence of the target. In example embodiments of the present disclosure, the modulation has a different impact on the desired signal than on the background signal. In example embodiments of the present disclosure, by correlating the detected signal obtained from the detector with the modulation of the physical parameter, the signal to noise ratio of the sensor device can be increased. In example embodiments of the present disclosure, the background signal can be decreased with 3 dB or more, preferably with 10 dB or more, or 20 dB or more, or 40 dB, or more. The target concentration may for example be below 10 nM, or even below 1 nM, or even below 100 pM, or even below 10 pM.

In embodiments of the present disclosure the processor is adapted for taking into account the dependency of the luminescent signal of the target on the modulation of the physical parameter and/or the dependency of the background signal on the modulation of the physical parameter.

In example embodiments of the present disclosure, the difference in modulation dependency of the desired signal and of the background signal can be exploited to increase the signal to noise ratio. In example embodiments of the present disclosure the minimum concentration of targets which can be detected can be decreased.

In embodiments of the present disclosure the device is adapted for use with fluorescent targets.

In example embodiments of the present disclosure, the radiative lifetime of a fluorescent target is limited (e.g. around 5 ns or less). This allows to decrease the measurement time or to increase the number of measurements after which averaging can be applied.

In embodiments of the present disclosure the modulator is adapted for changing the temperature of the device.

In example embodiments of the present disclosure, the temperature is a physical parameter which can be easily modulated. The modulator can for example be a resistor or a Peltier element. Such modulators are easy to build in a miniaturized version, for instance into a chip. In example embodiments, the desired signal and the background signals have a different temperature dependence. By modulating the temperature, the desired signal will therefore have a different modulation than the background signals. In example embodiments of the present disclosure, this different response can be used to increase the signal to noise ratio.

In embodiments of the present disclosure the modulator is adapted for changing the power and/or the wavelength of excitation light generated by the light source.

In example embodiments of the present disclosure, by modulating the power and/or the frequency of the excitation light, the response of the luminescent target can be modified. In example embodiments of the present disclosure, this modification can be different from the modification of the background signal. In embodiments of the present disclosure the luminescent targets can be photo-activated/deactivated by modulating the excitation light. This allows to alternatingly conduct a first background measurement (without desired signal being present) and a second measurement of the desired signal including the background signal. In example embodiments of the present disclosure, by analyzing consecutive measurements the contributing background signal can be reduced or removed.

In embodiments of the present disclosure the device may be used with the target present in a liquid, wherein the modulator is adapted for changing the pH value of the liquid.

In example embodiments of the present disclosure, the luminescence response of the target can be modified by modulating the pH value of the liquid in which the target is present. In example embodiments of the present disclosure, the modulation of the background signal under influence of a changing pH value is different from the modulation of the desired signal.

In embodiments of the present disclosure the modulator is adapted for modulating the amount of luminescent targets contributing to the desired signal and/or the amount of sources contributing to the background signal.

In example embodiments of the present disclosure, the sources contributing to the measured signal can be distinguished. By modulating the amount of luminescent targets contributing to the desired signal, the contribution of the luminescent targets can be quantified. By modulating the amount of sources contributing to the background signal, the contribution of the sources to the background signals can be quantified. Modulation of the amount of luminescent targets contributing to the desired signal and/or to the background signal may be done by stimuli with effect on the binding or immobilization of the desired and/or undesired evince, for instance by differently influencing specific and non-specific bonds.

In embodiments of the present disclosure the modulator is adapted for modulating the rate at which the amount of luminescent targets binds.

This may be done by alternating the flow over the sensor surface between a flow of the unknown sample and a flow of liquid, for instance buffer, without the target molecules. After saturation of the background signal (which happens relatively fast), the concentration of the target molecule may be modulated, which will modulate the slope of the accumulation curve. The difference in slope between accumulation with and without unknown sample can be used to determine the target concentration in the unknown sample. In example embodiments of the present disclosure, the modulation of the slope of the measured signal can be used to quantify the amount of luminescent targets. In embodiments of the present disclosure the background signal saturates faster than the desired signal. When the background signal is saturated, the contribution of the background to the total signal is constant. The slope of the total signal will from then on be defined by the rate at which the amount of luminescent targets increases. Hence, after the background signals have saturated, modulating the concentration of the target will modulate the slope of the accumulation curve. In embodiments of the present disclosure the difference in slope of the accumulation curve is correlated with the applied modulation to obtain the target concentration.

A sensor device according to embodiments of the present disclosure may comprise:
a surface or a three dimensional volume for binding the luminescent targets,
an evanescent field generating structure, wherein the light is coupled to the evanescent field generating structure and wherein the evanescent field generating structure is adapted for generating an evanescent field at the surface or in the three dimensional volume.

In example embodiments of the present disclosure, the illuminated volume is concentrated towards the luminescent targets and the therefore the background signal decreases whereas the desired signal remains the same when comparing with devices with free space illumination.

In a second aspect, the present disclosure provides a diagnostic device comprising a sensor device according to embodiments of the first aspect of the present disclosure, for sensing an analyte and generating a sensing signal, and an output unit for providing an output of the sensor device on which a diagnose can be based. The output unit may be adapted for outputting a signal representative for presence/absence or concentration of the analyte.

In a third aspect, the present disclosure provides a method for quantifying luminescent targets. The method comprises:
exciting the luminescent targets, thus generating a luminescence signal,
detecting a first measured luminescence signal, wherein the measured luminescence signal comprises a desired signal emanating from the luminescent targets and a background signal,
modulating a physical parameter,
repeating the exciting and detecting steps, thus obtaining a second measured luminance signal, wherein the modulating of the physical parameter has resulted in a modulation of the desired signal which is different from the modulation of the background signal, and
correlating the modulation of the physical parameter with the modulation of the desired signal and/or the modulation of the background signal, thus obtaining a quantification of the luminescent targets.

In embodiments of the present disclosure the correlating step comprises taking into account the dependency of the desired signal on the modulation of the physical parameter and/or the dependency of the background on the modulation of the physical parameter.

A method according to embodiments of the present disclosure may comprise:
calibrating the luminescence of the target as a function of the modulation of the physical parameter, and/or
calibrating the dependency of the background signal as a function of the modulation of the physical signal.

In example embodiments of the present disclosure, calibration can be done before, during or after measuring the target luminescence. In embodiments of the present disclosure this is enabled by measuring the dependency of the background signal in the presence of a high amount of targets such that the signal is very high compared to the noise and by measuring the dependency of the background signal when no targets are present. A separate channel could be foreseen such that in one channel targets are present and in the other channel no targets are present. The other channel can then be used for background measurements.

Particular aspects of the disclosure are set out in the accompanying independent and dependent claims. Features from the dependent claims may be combined with features of the independent claims and with features of other dependent claims as appropriate and not merely as explicitly set out in the claims.

These and other aspects of the disclosure will be apparent from and elucidated with reference to the embodiment(s) described hereinafter.

Figure 1:
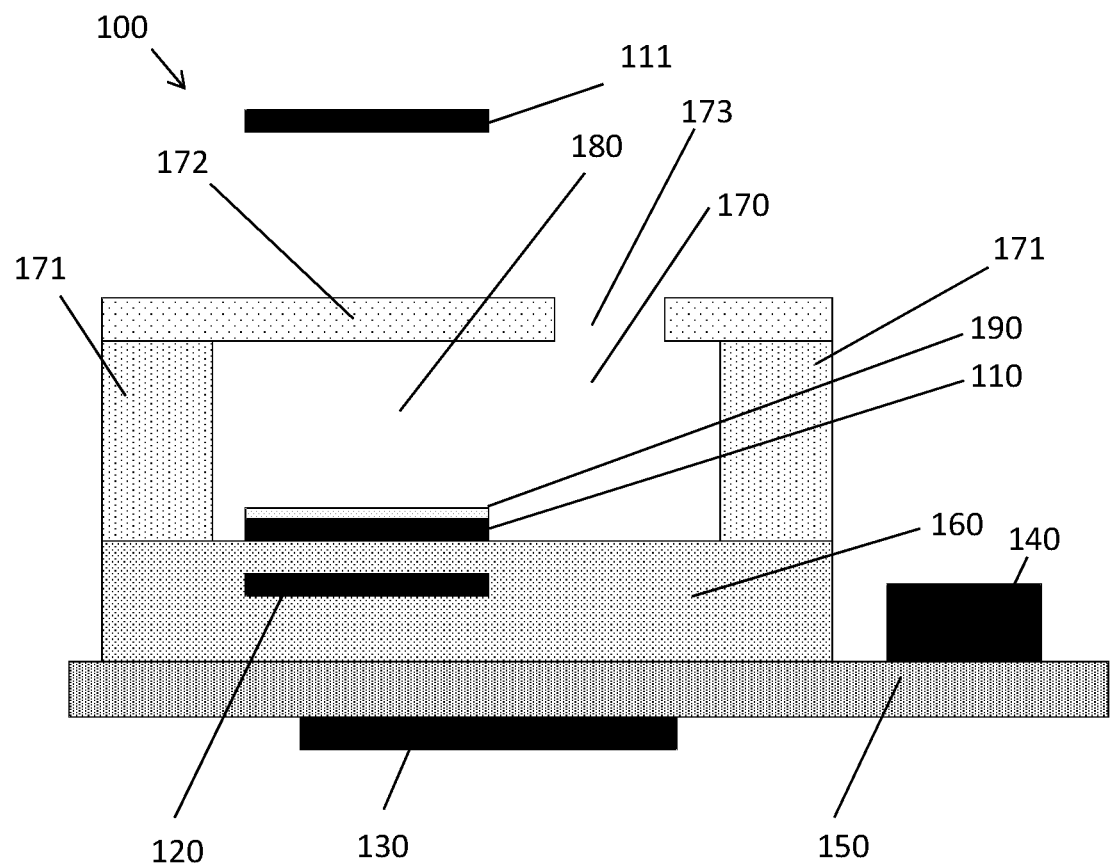
FIG. 1 is a schematic drawing of a device in accordance with example embodiments.

The drawings are only schematic and are non-limiting. In the drawings, the size of some of the elements may be exaggerated and not drawn on scale for illustrative purposes.

Any reference signs in the claims shall not be construed as limiting the scope.
In the different drawings, the same reference signs refer to the same or analogous elements.

DETAILED DESCRIPTION

The present disclosure will be described with respect to particular embodiments and with reference to certain drawings but the disclosure is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the disclosure.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the disclosure described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the disclosure described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present disclosure, the only relevant components of the device are A and B.

Reference throughout this specification to "one embodiment" or "an embodiment" means that a particular feature, structure or characteristic described in connection with the embodiment is included in at least one embodiment of the present disclosure. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the disclosure, various features of the disclosure are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed disclosure requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this disclosure.

Furthermore, while some embodiments described herein include some but not other features included in other embodiments, combinations of features of different embodiments are meant to be within the scope of the disclosure, and form different embodiments, as would be understood by those in the art. For example, in the following claims, any of the claimed embodiments can be used in any combination.

In the description provided herein, numerous specific details are set forth. However, it is understood that embodiments of the disclosure may be practiced without these specific details. In other instances, well-known methods, structures and techniques have not been shown in detail in order not to obscure an understanding of this description.

As used herein and unless provided otherwise, the term "analyte" or "target" refers to the substance to be measured, the substance having or not having a biological origin. By the expression "substance having a biological origin", we intend to mean a substance that is present or produced in a living organism. Particularly, the substance may be a biomolecule. For instance, the analyte may be a protein or an antigen. The analyte may or may not be labeled for detection. In the context of the present disclosure, the terms target and analyte are considered to be synonyms.

By the term "biomolecule" is meant any molecule that is present in living organisms, including large macromolecules such as proteins, polysaccharides, lipids, and nucleic acids, as well as small molecules, such as primary metabolites, secondary metabolites, and natural products. The term "biomolecule" also encompasses molecules with similar properties and/or structure and/or composition, but that have been manufactured artificially rather than in a living organism.

Where in embodiments of the present disclosure reference is made to the modulation dependency of the desired signal or of the background signal, reference is made to the dependency of the desired signal on the modulation of the physical parameter or to the dependency of the background signal on the modulation of the physical parameter.

Where in embodiments of the present disclosure reference is made to "luminescence of a target", reference is made to emission of light by the target, not resulting from thermal emission. Typically, in the context of the present disclosure, luminescence will be photoluminescence, generated by absorption of photons; such as fluorescence or phosphorescence. The present disclosure, however, is not limited to this type of luminescence, and can also be applied in case of, for instance, bioluminescence or chemiluminescence (emission as a result of a (bio)chemical reaction by an organism) or electroluminescence (a result of an electric current passed through the target).

Where in embodiments of the present disclosure reference is made to the "brightness" of a luminescent center, reference is made to the strength of the luminescent response to the excitation light. For a fluorophore the brightness is the product of the absorption coefficient (e.g., which fraction of the light is absorbed) and the quantum efficiency (e.g., which fraction of the absorbed light gives rise to the emission of a fluorescent photon). For a scattering center the brightness describes which fraction of the light is scattered.

Where in embodiments of the present disclosure reference is made to the "background signal", reference is made to any signal which is disturbing the measurement of the desired signal. This may comprise background signals from luminescent sources which do not form part of the target under study. This may comprise luminescence which is scattered by scattering centers in the device. This may comprise any other noise source which is present in the device.

Where in embodiments of the present disclosure reference is made to "quantifying luminescent targets", reference is made to either determining the presence of luminescent targets, or determining the amount of luminescent targets, or determining the concentration of luminescent targets.

In a first aspect, the present disclosure provides a device 100 for quantifying targets (analyte) which may be present in a fluid sample, e.g. in a biological fluid such as a blood sample, a urine sample, a drop of saliva, sperm. One embodiment of such device 100 is schematically illustrated in FIG. 1. Devices according to embodiments of the present disclosure may comprise a microfluidic channel 170 for guiding the sample towards a cavity 180 in or on a substrate 160, for instance a semiconductor substrate such as e.g. a silicon substrate or a transparent substrate such as e.g. a glass substrate. The microfluidic channel 170 and/or the cavity 180 may have sidewalls 171 and top 172, inlet(s) and/or outlet(s) 173. These sidewalls 171, 172 and/or inlets/outlets 173 may be transparent or opaque. The cavity 180 and the microfluidic channel 170 may be the same. The cavity 180 may comprise a surface 190 on which affinity probes may be present for capturing the target molecule. In embodiments of the present disclosure the analyte may be luminescent (e.g. fluorescent) itself or it may be labeled with a luminescent label.

In embodiments of the present disclosure the sample may be injected in the device as a one-time event (e.g. filling a reservoir) or the injection may be a continuous event (e.g. triggered by starting a flow) that continues during the subsequent steps when quantifying the targets.

In embodiments of the present disclosure the luminescent targets may be illuminated through (regular) free space illumination or through evanescent illumination. In free space illumination light source 111 is illuminating at least the surface 190 with the affinity probes. The light source 111 may be located at the top (the top wall 172 and any other layer between the light source 111 and the cavity 180 should be transparent) or bottom (the substrate 160 and any other layer between the light source 111 and the cavity 180 should be transparent) of the sensor device 100. The light source 111 may be, amongst others, a laser, a laser diode, a VCSEL, a LED, a lamp, a Tungsten lamp, a Halogen lamp, a Mercury lamp, a Xenon lamp, a Metal Halide lamp. In embodiments of the present disclosure the light coming from the light source 111 may be projected or focused by lenses or mirrors or a microscope or optical fibers on the surface 190. (In this case no evanescent field generating structure 110—see below—is present).

In case of evanescent illumination, devices according to embodiments of the present disclosure comprise an evanescent field generating structure 110 for generating an evanescent field at the surface 190.

The evanescent field generating structure 110 may be integrated in or on the substrate 160 or it may be separate from the substrate 160 (e.g. against the microfluidic channel top 172 or sidewalls 171). In embodiments of the present disclosure the light of the light source 111 may be guided towards the cavity 180 using a connecting structure 112 such as an optical waveguide. The light may be coupled to the evanescent field generating structure 110 or to the connecting structure 112 using any suitable optical device, such as for instance a grating coupler or a butt coupler.

In embodiments of the present disclosure the light source 111 may be integrated in the substrate 160. In case of close integration with the rest of the device 100, the light source 111 may be, amongst others, a laser, a laser diode, a VCSEL, a LED. These light sources may be applied in the case of evanescent excitation.

In case the light source 111 is not necessarily closely integrated with the rest of the device 100 it may also be a laser, a lamp, a Tungsten lamp, a Halogen lamp, a Mercury lamp, a Xenon lamp, a Metal Halide lamp. This type of light source can also be applied in the case of evanescent excitation.

Devices 100 according to embodiments of the present disclosure moreover comprise a detector 120 which can detect the luminescence of the luminescent target after the target has been excited with the evanescent field generating structure 110 or light source 111. The measured signal is composed of a desired signal which originates from the luminescent targets and a background signal emanating from other luminescent sources present in the system. The detector 120 may be a multi-pixel detector for imaging the surface 190 of the device 100. The detector 120 may be, amongst others, an imager, a line detector, a single detector, a CMOS detector, a CCD detector, a(n array of) photodiode(s), an (array of) avalanche photodiode(s), a(n array of) photomultiplier tube(s) PMT(s). The detector 120 may be located external to the cavity 180 (not integrated in/in physical contact with either substrate 160 or top 172). In that case at least one top or bottom wall (e.g. walls from the microfluidic channel 171, 172, substrate 160, any other layer) should be transparent such that the luminescence signals from the luminescent targets can exit from the cavity through this wall. In case the detector is located external to the cavity additional lenses, as used in classical optics, may be applied for guiding the luminescence signals towards the detector.

In embodiments of the present disclosure the detector 120 may be integrated with the cavity 180. It may be present at the top or at the bottom of the cavity. The bottom side is the side where the target molecules bind to the affinity probes, the top side is the opposite side thereof. The detector 120 may be present on the inside or the outside of the cavity. When the detector 120 is present on the outside, the cavity may include a transparent wall.

In embodiments of the present disclosure luminescence from the luminescent targets may be collected by a waveguide connected to the detector 120. This waveguide may be the same as the connecting structure 112, or it may be a different waveguide. The luminescent light may be coupled from the waveguide into the detector 120 the same way as the light coming from the light source is coupled into the waveguide (e.g. through a grating coupler, butt coupling etc.). This may be the same coupler as the input coupler, if it has enough bandwidth and if incoming and outgoing light is handled appropriately, or it may be a different coupler. In embodiments of the present disclosure the input coupler and the output coupler are different. In embodiments of the present invention diffraction and/or reflection optics may be present between the waveguide and the detector. This may for example be a lens to project the output couplers onto the detector. Filters may be present, in, on or before the detector, for attenuating light which is outside the frequency range of the light generated by the luminescent targets. The detector 120 may be a CMOS imager.

Devices 100 according to embodiments of the present disclosure moreover comprise a modulator 130 for modulating a physical parameter which influences the luminescence of the luminescent target and/or the luminescence of the background contributions such that the resulting modulation of the desired signal is different from the modulation of the background signal. The physical parameter may for example be the temperature of the target and/or the power/frequency of the excitation light and/or the pH of the solution in which the target is present and/or the concentration of the target.

A device 100 according to embodiments of the present disclosure moreover comprises a processor 140 which is configured to correlate the luminescence detected by the detector 120 with the modulation of the physical parameter. The cross-correlation between both might for example be calculated. The term processor 140 should be interpreted widely. It can be a microprocessor but it can for example also be an ASIC (application specific integrated circuit) or an FPGA (field programmable gate array), or an analog or digital signal processing device. The processing may be distributed. It may for example be partly or completely running on an external device (e.g. a smartphone). The external device, e.g. smartphone, may for example receive raw data (digitized output of the detector) or it may receive already pre-treated data.

A device 100 according to embodiments of the present disclosure may be present on a printed circuit board 150. It may comprise a needle or a suction element like a cotton strip (not illustrated) and a microfluidic channel 170 for taking or receiving a fluid sample and guiding it to the surface 190. In example embodiments of the present disclosure, the different features involved with executing the steps for analyzing a fluid sample may be integrated in one and the same device 100.

Depending on the embodiment, the fluidics of the device 100 can be different. They can for example be capillary and/or they can be pressure driven, e.g. pumped. Pumps can for example control the pressure or the volumetric flow rate. The microfluidic channel 170 can be an open channel or a closed channel. A schematic drawing of a device 100 in accordance with embodiments of the present disclosure and comprising the features as described above is shown in FIG. 1.

The size of the device 100, in accordance with embodiments of the present disclosure, is limited. The size may for example be comparable to the size of an SD-card or of a micro-SD card or of a USB-stick.

Embodiments of the present disclosure can for example be used to check if certain biomarkers are present in the fluid (e.g. presence of antibodies against HIV in a blood sample).

In embodiments of the present disclosure the background signal may have different origins. Luminescent sources may be present which are not linked with the analyte, hence which do not form part of target molecules. These will, nevertheless, be detected by the detector 120 and will increase the background signal of the device 100.

Figure 2:
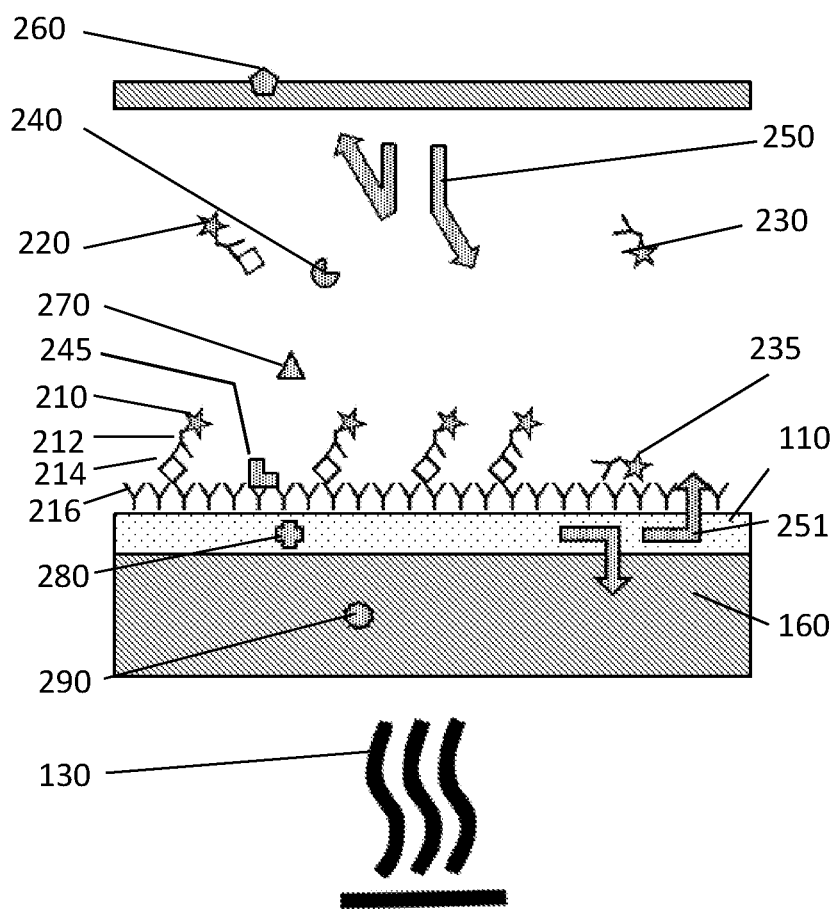
FIG. 2 is a schematic drawing illustrating the origin of desired and background signals in a device in accordance with example embodiments.

In an exemplary embodiment of the present disclosure, illustrated in FIG. 2, the sensor device 100 is based on a sandwich ELISA like assay. The disclosure, however, is not limited thereto, but may for instance also be based on competitive assays and inhibition assays, where analogous sources of background are present. In a sandwich assay the target may comprise luminescent parts that are e.g. fluorescent, or may be attached to luminescent labels that are e.g. fluorescent labels. A fluorescence signal which is coming from a target which is bound to the surface 190 or immobilized in a 3D matrix or gel (not in the embodiment illustrated), whereby the target comprises fluorescent analyte, or a fluorescent label which is bound to the analyte, is part of the desired signal. In fluorescence detection, fluorescent signals coming from labels in the bulk are to be avoided. In example embodiments of the present disclosure, which comprise an evanescent field generating structure 110, contribution of these signals can be reduced. Sources of the desired signal and of background signals in a device 100 comprising a sandwich ELISA like assay, according to embodiments of the present disclosure are illustrated in FIG. 2. FIG. 2 shows a sketch for the case of pre-incubation. In that case in a first step the detection probe (e.g., detection label) are mixed with the analyte. In a next step this mixture flows over the surface 190 with the capture probes. In example embodiments, real-time measurements can be performed, in which the rate at which the target binds to the surface can be followed. In this example the origins of the desired signal are the labels 210 indicated by a star which are connected to the targets 214 indicated by a rhombus and which are bound to the surface 190 (or could alternatively be immobilized in a 3D matrix or gel). In the example the labels 210 are fluorescent labels which are linked to a second affinity probe (e.g. second antibody 212). The second affinity probe is linked to a target 214 which is linked with a first affinity probe (e.g. first antibody 216). In the embodiment illustrated, the first affinity probes are forming the surface 190 on top of the evanescent field generating structure 110. Instead of a surface 190, in other embodiments of the present disclosure, the targets may be bound on a 3D-matrix or gel. In that case the first affinity probes are immobilized in a 3D matrix or gel. In the pre-incubation period, the labels indicated with reference 220 are those labels which are already connected with a target 214 but are not yet caught on the surface 190. In the embodiment illustrated the targets 214 have a rhombus shape, the detection probes (e.g. second antibodies 212) have an inverse Y-shape and the capture probes (e.g. capture antibodies such as first antibodies 216) have a Y-shape. In such a device 100, besides other noise sources, the background signal may be coming from:

(Auto)Fluorescent molecules 245, including labels 235 which are (non-specifically) bound to the surface 190 and which are not connected with the targets 214. These are illustrated by the L-shaped symbol in FIG. 2. These also include the labels 235 which are bound to the second antibody 212 and to the surface 190, but wherein the second antibody 212 is not bound to the target 214.

Molecules 240 in solution. These may be (auto)fluorescent molecules 240 which have no link with a second antibody. They are illustrated by the pie-shape symbol in FIG. 2. They may for example be proteins. They mostly come from the sample, but can also come from the detection antibody mix, or the blocking agents (e.g. BSA). Molecules 240 are molecules that cannot be avoided, as they are part of the sample or a key ingredient in the assay. They may or they may not be fluorescent. When they are not fluorescent they still may scatter light and therefore increase the background signal.

Free labels 230 in the solution which are bound to the second antibody 212 but wherein the second antibody 212 is not bound to the target 214. These labels 230 are intentionally fluorescent, and they are present in a real-time (wash-free) assay. These labels 230 are not present in an endpoint assay, after washing.

Labels 220 in the solution which are bound to the second antibody 212 and wherein the second antibody 212 is bound to the target 214. These labels 220 are intentionally fluorescent, and they are present in a real-time (wash-free) assay. These labels 230 are not present in an endpoint assay, after washing.

(Auto)Fluorescent centers 270 in the solution. The triangle in FIG. 2 is an illustration of such a fluorescent center. These centers are present in the buffer (the solvent) itself (i.e. the matrix wherein the (bio)molecules are present). These centers may for example be present in a buffer used in a bioreactor (when using a sensor device 100 according to embodiments of the present disclosure in the bioreactor). In that case the buffer may be the cell culture medium which can have a complex composition and may comprise components that show luminescence (e.g. fluorescence). Often additional components are added depending on the exact nature of the cells/bacteria/yeasts/tissue that is cultured. These centers 270 will stay also when changing to buffer flow whereas the autofluorescent molecules 240 are absent in the buffer.

(Auto)Fluorescent centers 280 in the structure for generating an evanescent field 110. The cross in FIG. 2 is an illustration of such a fluorescent center.

(Auto)Fluorescent centers 290 in the substrate 160. The circle in FIG. 2 is an illustration of such a fluorescent center.

(Auto)Fluorescent centers 260 in any other part of the device 100. The pentagon in FIG. 2 is an illustration of such a fluorescent center.

Scattering 250, 251 of the excitation light. The arrows 250, 251 in FIG. 2 illustrate the scattering of the excitation light in case of free space excitation (250, e.g. illumination through a lens) and in the case of excitation using an evanescent field (251, e.g. using a waveguide). The scattering may e.g. be caused by imperfections or discontinuities in the device or the sample. Embodiments of the present disclosure comprise for example a rejection filter for filtering out the direct and/or reflected and/or scattered excitation light. However, the rejection ratio of this filter is not infinite and therefore a part of the scattered excitation light reaches the detector.

These background signals increase the noise and therefore decrease the signal to noise ratio, while it is desired to have the signal to noise ratio as large as possible.

Instead of pre-incubation, another approach would be to first send over the analyte, wash to remove any unbound particles, then send over the labelled detection probe, and wash again. In that case, some background sources are different/absent (e.g. the combination would not be present, and some auto fluorescent molecules 240 would not be present in the detection probe). However, in this approach we cannot do real-time measurements, so the time-to-response is longer)

Embodiments of the present disclosure are not limited to the standardized enzyme-linked immunosorbent assay (ELISA) as illustrated in FIG. 2 or its variants, but include any affinity-based assay and can for example also be DNA based. The DNA measurements may comprise a PCR step and may involve a higher fluorophore concentration.

In embodiments of the present disclosure the modulator 130 is provided to aid increasing the signal to noise ratio.

In particular embodiments, the modulator can change the temperature of the device 100. In such embodiments, luminescent labels (e.g. fluorophores) may be chosen of which the luminescent response has a distinct temperature dependency. In example embodiments of the present disclosure, the desired signal has, in that case, a different temperature behaviour than the background signal.

The modulator 130 may comprise a heater and a heater control system for controlling the temperature of the system. The heater control system may include a temperature sensor. This temperature sensor may be used for controlling the temperature (in a closed loop system) or for monitoring the temperature only (in an open loop system). The heater may for example be a resistive heater or a Peltier element or a radiative heater or an infrared heater.

Figure 3:
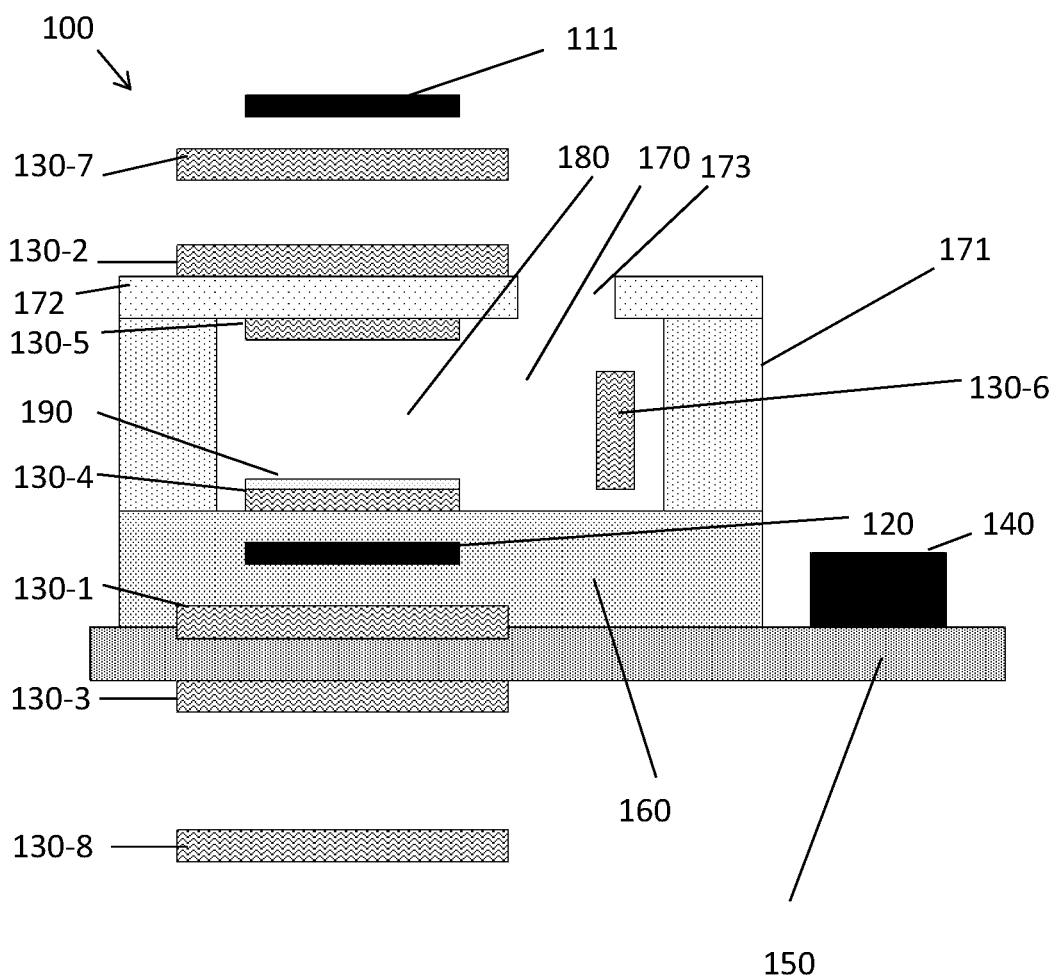
FIG. 3 shows possible positions of a heater in a device in accordance with example embodiments, wherein the device is configured for free space excitation.

FIG. 3 shows possible positions of a modulator 130 (e.g., a heater), in a device 100 in accordance with embodiments of the present disclosure wherein the device is configured for free space excitation. The heater may be located on position:

130-1 corresponds with the bottom of the device 100, in the example this is between the detector 120 and the PCB 150

130-2 corresponds with the top of the device 100, in the example this is above the top wall 172 which closes the microfluidic channel; in that case the light source 111 may be at the bottom (e.g. with transparent substrate)

103-3 corresponds with the backside of the PCB 150 (if present), in the figure this is on the side of the PCB opposite to the cavity 180

130-4 inside the cavity, under the surface 190

130-5 inside the cavity, at the top side; in that case the light source may be at the bottom

130-6 somewhere in the channel; in that case the heater may for example be carried to the measurement cavity 180 by the liquid flow consisting of the sample or a buffer

Figure 4:
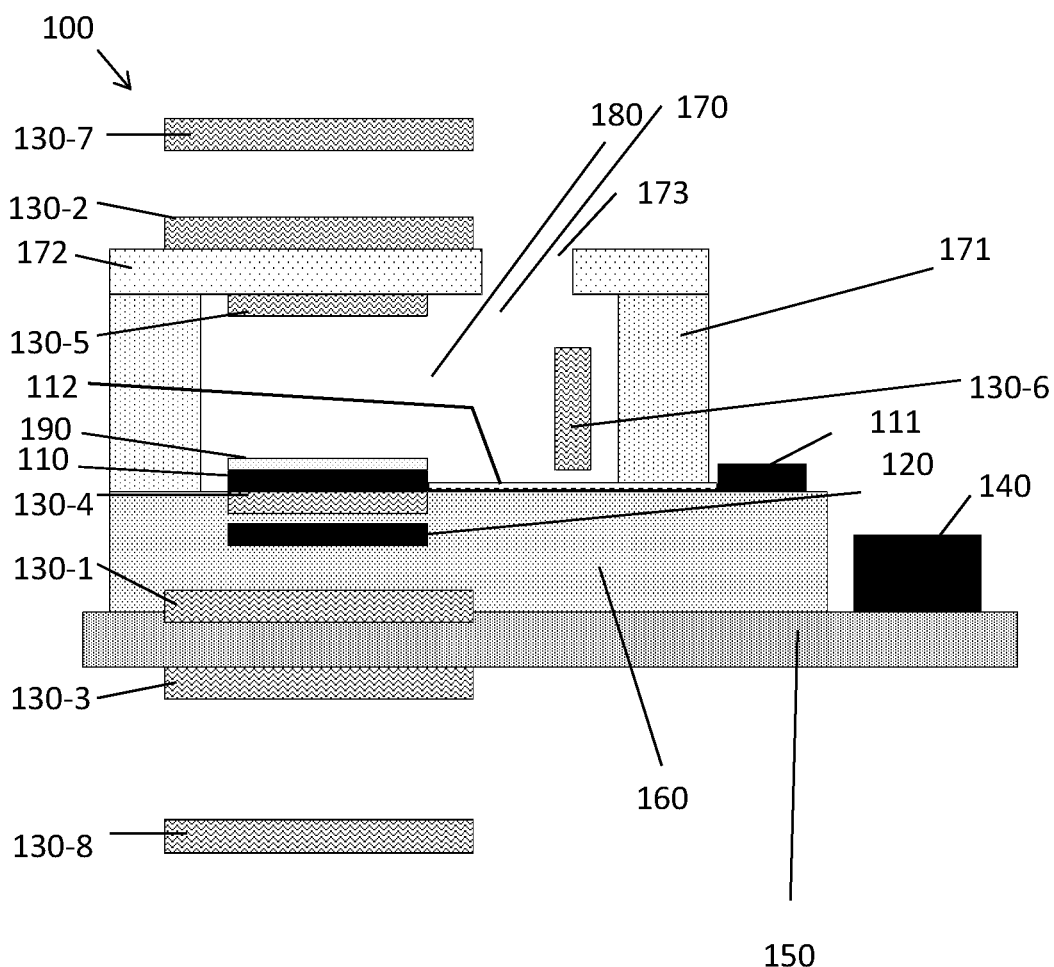
FIG. 4 shows possible positions of a heater in a device in accordance with example embodiments, wherein the device is configured for evanescent excitation.

130-7, 130-8 not in contact with the rest of the device 100; in that case the heater may for example be a radiative or an infrared heater FIG. 4 shows the possible positions of a modulator 130 (e.g., a heater), in a device 100 in accordance with embodiments of the present disclosure wherein the device is configured for evanescent excitation. The possible positions of the heater are essentially the same, except that location 130-4 where the heater has to be positioned below the evanescent structure 110, such that the evanescent field generating structure 110 is between the surface 190 and the heater. Location 4 may be such that the heater is outside of the evanescent field.

In embodiments of the present disclosure the processor 140 takes into account the dependency of the luminescence of the label on the modulation of the physical parameter and/or the dependency of the background signal on the modulation of the physical parameter. The physical parameter may for example be the temperature; the present disclosure, however, not being limited thereto. In embodiments of the present disclosure a temperature variation is applied between subsequent measurements and the known (or calibrated) temperature dependence of the background signals and of the desired signal is used to remove or attenuate the background response from the output signal of the detector 120.

Figure 5:
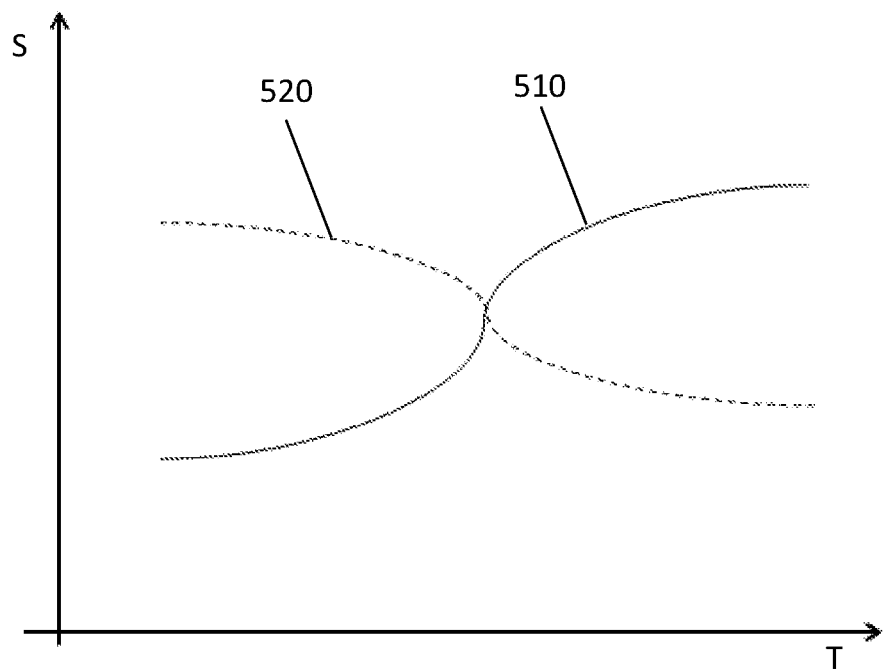
FIG. 5 shows a temperature dependence of the signal of a fluorophore which is quenched at low temperature and a temperature dependence of a background signal, in accordance with example embodiments.

FIG. 5 illustrates an example of the temperature dependence of the signal of a fluorophore which is quenched at low temperature (line 510) and an example of the temperature dependence of a background signal (dashed line 520). The signal strength S is shown as a function of the temperature T. In this example the power of the fluorescent signal of the quenched fluorophore is increasing with temperature whereas the power of the background signal is decreasing with temperature. In other embodiments of the present disclosure other temperature relationships may exist as long as the modulation of the desired signal is different from the modulation of the background signal. By measuring at different temperatures, the signal from the quenched fluorophores can be separated from the background signal by taking into account the respective temperature dependencies.

The processor 140 may for example be configured to apply the following exemplary correlation. If the signal (S) and the background (B) change with a factor a and b, a and b having been calibrated, when changing the temperature from T1 to T2, e.g.

$$S2 = a \times S1 \text{ or } S2/S1 = a \text{ (e.g. } a > 1 \text{ on FIG. 5)}$$

$$B2 = b \times B1 \text{ or } B2/B1 = b \text{ (e.g. } b < 1 \text{ on FIG. 5)}$$

The responses (=signal+background) R1 and R2 are measured and can be written as:

$$R1 = S1 + B1 \quad (1)$$

$$R2 = S2 + B2 = a \times S1 + b \times B1 \quad (2)$$

S1 and B1 can be determined by solving these two equations since R1 and R2 are known (measured), and since a and b are known (calibrated). In this particular case: multiply eq (1) by b, then subtract eq (2):

$$b \times R1 = b \times S1 + b \times B1 \quad b \times (1)$$

$$R2 = a \times S1 + b \times B1 \quad (2)$$

$$b \times R1 - R2 = (b-a) \times S1 + (b-b) \times B1 = (b-a) \times S1$$

$$\rightarrow S1 = (b \times R1 - R2)/(b-a)$$

B1 can be determined in a similar way

Figure 6:
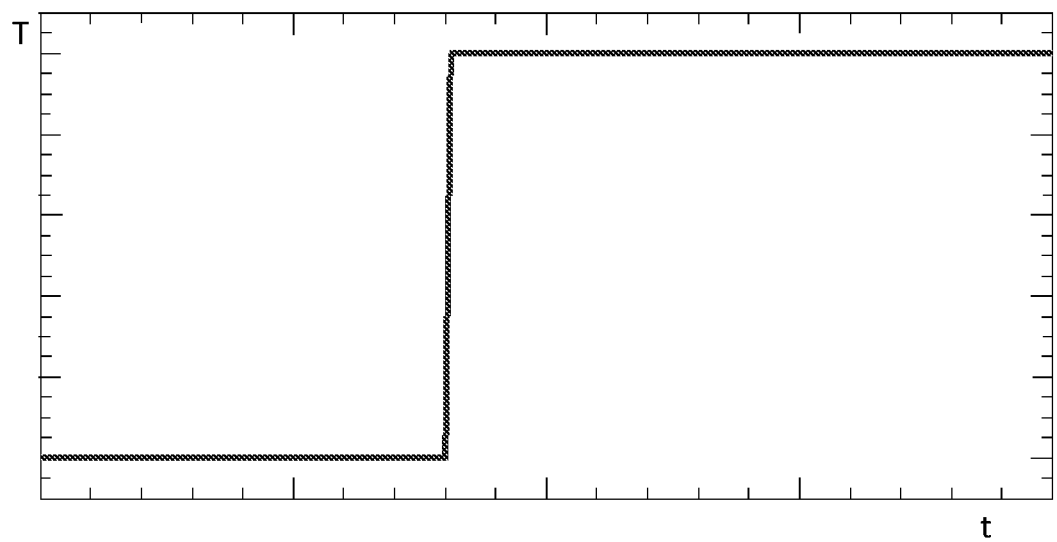
FIG. 6 shows a temperature step applied to a device in accordance with example embodiments.

This is true in general, even if more data points (e.g., more equations R3=. . . , R4=. . . ) and/or a more complex temperature modulation as e.g. FIGS. 5-6 are applicable. In those cases the system is overdetermined. Instead of solving these equations analytically, which would give contradictions because of random noise, curve fitting may be used (e.g. maximum likelihood estimations).

In general, the fluorescent response of the fluorophore will be temperature dependent. In embodiments of the present disclosure, specific fluorophores may be used for which the fluorescence may increase with increasing temperature (e.g. from 10° C. towards 60° C.). This is may be caused by the fact that a quencher is bound to the fluorophore, and that the quenching is temperature dependent. At lower temperatures the quencher may be bound closely to the fluorescent group and therefore the fluorescence may be quenched whereas at higher temperatures the interaction may be broken causing the quencher to move further away and the label to become fluorescent. The brightness of (some of the) background sources (e.g. (auto)fluorescent molecules 240, 245, (auto)fluorescent centers 260, 270, 280, 290, scattering 250, 251) may show a different temperature dependence. This difference in temperature behaviour can be exploited to increase he signal to noise ratio by modulating the temperature and correlating the measured signal with the modulation, taking into account the temperature dependency of the fluorescent label and the temperature dependency of the free fluorophores (at least partly causing the background signal).

In embodiments of the present disclosure labels may be used which have an intrinsic temperature dependency. The labels may be designed specifically to increase the temperature dependency of the label.

In embodiments of the present disclosure different binding events may have a different temperature dependence. Since for example some non-specific interactions are weaker than a specific bond, such non-specifically bound molecules will disconnect more easily from the surface 190 than specifically bound molecules. This will result in a different temperature dependency of the fluorescent response for such non-specifically bound molecules compared to specifically bound molecules. The part of the background signal generated by the non-specifically bound molecules will decrease when they are disconnecting from the surface with increasing temperature. When disconnected they will go up in the bulk which is, in embodiments with an evanescent field generating structure 110, not illuminated by the light source. Hence, by bringing the surface 190 to a higher temperature, high enough to break such non-specific bonds, but low enough not to break specific bonds, the signal to noise ratio can be improved.

Some other non-specific interactions are stronger than a specific bond, such non-specifically bound molecules will disconnect less easily from the surface 190 than specifically bound molecules. This will result in a different temperature dependency of the fluorescent response for such non-specifically bound molecules compared to specifically bound molecules. The part of the background signal generated by the non-specifically bound molecules will remain unchanged when the specifically bound molecules are disconnecting from the surface with increasing temperature. When disconnected they will go up in the bulk which is, in embodiments with an evanescent field generating structure 110, not illuminated by the light source. Hence, by bringing the surface 190 to a higher temperature, high enough to break specific bonds but not such non-specific bonds, the signal to noise ratio can be improved.

Figure 7:
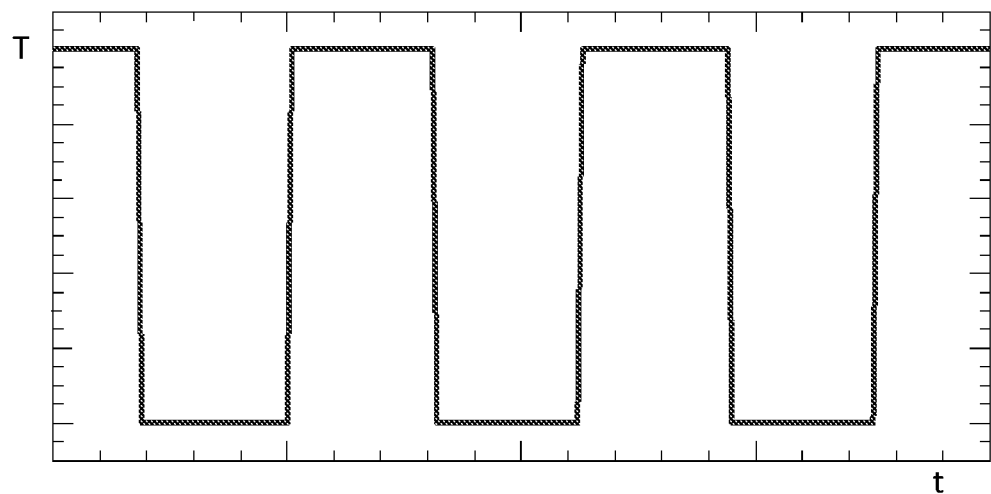
FIG. 7 shows a series of temperature steps applied to a device in accordance with example embodiments.
Figure 8:
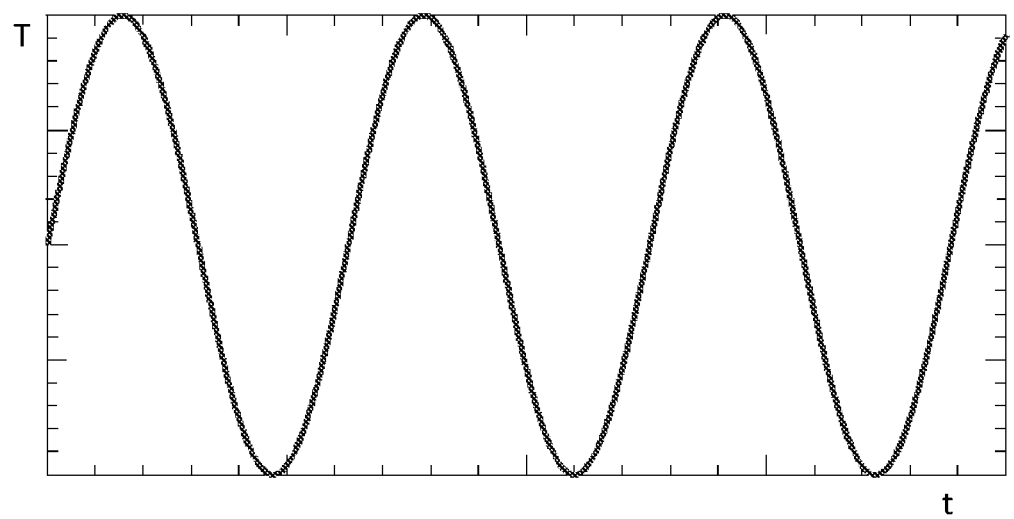
FIG. 8 shows a sine wave modulated temperature applied to a device in accordance with example embodiments.

The temperature may be modulated in several ways. A temperature step or a series of temperature steps may be applied. A continuous modulation, such as for instance a sine wave modulation, of the temperature may be applied. FIG. 6 shows an exemplary temperature step which may be applied to a device 100 in accordance with embodiments of the present disclosure. In this figure a step up is shown, a step up may however be possible also. FIG. 7 shows an exemplary series of temperature steps which may be applied to a device 100 in accordance with embodiments of the present disclosure. FIG. 8 shows an exemplary sine wave modulated temperature which may be applied to a device 100 in accordance with embodiments of the present disclosure.

In embodiments of the present disclosure the modulator 130 may change the physical parameter(s) before a binding equilibrium is reached or after the binding equilibrium is reached. In the example of FIG. 2 first antibodies 216 may be linked to the surface 190 of the device 100. These antibodies 216 link with the targets 214 and through second antibodies 212 the luminescent label 210 may be linked with the analyte. The surface 190 may for example comprise between 1000 and 1 000 000 binding sites per µm² for example 20000 binding sites per µm². In embodiments of the present disclosure the number of binding events per µm² of surface 190 may be obtained by evaluating the following formula:

$$k_{ON}[A][B]$$

wherein [A] is the target concentration, and wherein [B] is the surface density of the free binding sites, and wherein $k_{ON}$ is the association rate constant. $k_{ON}$ is among other things defined by the reaction kinetics between the target and the capture probe and the mass transport kinetics of the target in the solution. The association rate constant may for example have an order of magnitude of $k_{ON}=10^5 M^{-1}s^{-1}$. If the target concentration is for example [A]=1 nM then:

$$k_{ON}[A]=10^{-4}s^{-1}$$

meaning that each binding site has a chance of $10^{-4}s^{-1}$ to bind with a target.

At a low target concentration only a limited number of binding sites will be occupied. If the surface density of the binding sites (e.g. the surface 190 comprising the first antibodies) is [B]=2×10⁴ µm² the number of binding events per µm² per second equals:

$$k_{ON}[A][B]=2\ s^{-1}\mu m^2$$

This rate decreases linearly with the target concentration and therefore also the desired signal decreases linearly with the target concentration.

The modulator 130 may modulate a physical parameter when the concentration of targets bound to the surface 190 has reached an equilibrium or when the concentration is still increasing.

In embodiments of the present disclosure, mainly the surface 190 of the substrate 160 or a limited three dimensional volume is illuminated. This may be done by evanescent excitation. In these embodiments the bulk of the sample is not illuminated using free space light but using an evanescent light near the surface 190. The evanescent field region may have a thickness of a few nm-thick or even 10 nm thick or even between 10 nm and 100 nm thick. Such evanescent illumination is also referred to as TIRF (total internal reflection fluorescence). This can be achieved by having a beam of light, coming from the evanescent field generating structure 110, incident on the interface between the evanescent field generating structure 110 and the cavity 180 at an incident angle below the critical angle, resulting in a total internal reflection. It can also be achieved by confining the light in a guiding structure such as a waveguide. TIRF can be applied in embodiments of the present disclosure. Only the luminescent labels (e.g. fluorophores) which are immobilized at the surface 190 of the substrate evanescent field generating structure 110, or which are in its immediate neighbourhood (i.e., within the range of the evanescent field) will be illuminated this way. The substrate 160, on which evanescent field generating structure 110 is fabricated may be a semiconductor substrate, a glass substrate, or any other suitable type of substrate. It may be a quartz substrate. Luminescent labels which are in the bulk solution are thereby not measured. When these luminescent labels in the bulk solution are not excited they will also not generate a background signal.

Embodiments of the present disclosure comprise a waveguide for guiding the excitation light towards the evanescent excitation plane. In example embodiments of the present disclosure, the luminescent labels (e.g. fluorophores) in the bulk solution will not be excited. Only the luminescent labels which are in the evanescent field volume will be illuminated. These luminescent labels are mainly the surface immobilized luminescent labels. The labels in the bulk, which are not illuminated or which are less illuminated than the immobilized labels at the surface, will therefore generate a smaller luminescent signal than the immobilized labels at the surface. In example embodiments of the present disclosure, by only illuminating the evanescent excitation plane, the signal to noise ratio can be increased.

In alternative embodiments of the disclosure, the desired signal may be separated from the background signals by modulating parameters different from temperature, such as for instance light, pH, other chemical stimuli, or the concentration of the target and/or of other assay components. By going through the isoelectric point of a fluorophore or an (auto)fluorescent center, its charge state changes. This changes its electronic configuration, and may influence its optical properties (such as the absorption cross-section, also known as extinction coefficient, and/or the emission quantum efficiency and/or the absorption and/or emission spectra). In example embodiments of the present disclosure, the physical parameters are selected such that they modulate the desired signal and such that modulation of the physical parameters does not have an effect on the scattering. By modulating these physical parameters and correlating the measurement result with the modulation, the contribution of the scattering signal can be decreased and may be even removed from the measured signal. In example embodiments of the present disclosure, the physical parameters are selected such that modulation of the physical parameters has a different effect on the modulation of the desired signal than on the modulation of some of the background signals (e.g. some sources of fluorescent background). By correlating the measurement result with the applied modulation the contribution of these background signals can be decreased and may be even removed.

In embodiments of the present disclosure where the pH is modulated, labels may be used for which the luminescence is depending on the acidity of the environment they are in. Such a label may for example be 5(6)-Carboxynaphthofluorescein, or 7-Hydroxycoumarin-3-carboxylic acid, or 6,8-Dihydroxy-1,3-pyrenedisulfonic acid disodium salt. A luminescent label might be chosen for which the absorption spectrum or the emission spectrum or both spectra change under influence of a changed acidity. In embodiments of the present disclosure a pH sensitive fluorophore may be used. In embodiments of the present disclosure this fluorophore is provided with an end group such that it can be used to label antibodies or other capture probes.

In order to be able to modulate the pH of the sample, a modulator 130 in a device according to embodiments of the present disclosure may comprise a reservoir with a fluid of a basic or acidic nature, with a pH different from the pH of the sample. When the modulator 130 is activated, the fluid of the reservoir may be mixed with the sample, so as to change the sample's pH. For instance, the pH of the sample may be changed such that the luminescent labels bound to the analyte have a strongly different absorption or emission spectrum, such that a background signal can be determined, which can then be deducted from the earlier measurement signal so as to obtain a signal with an improved signal to noise ratio.

The pH of the sample may also be modulated during sample preparation wherein different mixtures are prepared that are nominally identical, except for a different pH. This may for example be done in the case of pre-incubation with the detection probe. In that case for example a solution (buffer) is added with the probe. In the sample preparations samples may be prepared that are nominally identical, except for a different pH. These different samples may flow alternatingly through the cavity 180, over the surface 190.

In embodiments of the present disclosure where excitation light is modulated, photoswitchable labels may be used (e.g. C30H19F6N5O6). These dyes are photoactivatable by modulating the excitation light source. Photoswitching may be reversible.

In embodiments of the present disclosure, the modulation of the physical parameter may be used to selectively switch on or off the signal of the fluorophores, or of the background contributions. By doing measurements at different parameter levels, knowing that at one level the desired signal is switched off, the background signal can be determined, which determined background signal can then be removed (e.g. subtracted) from the signal measured at the other level of the parameter. Instead of completely switching on/off contributions to the desired signal and/or to the background signal partial switching may be implemented.

In embodiments of the present disclosure the modulator 130 can modulate the amount of luminescent targets contributing to the desired signal and/or to the amount of sources contributing to the background signal. The targets may be immobilized against a surface 190. Modulations may be applied that influence the amount of immobilized target molecules (with label), or the rate of change of this amount, in a different way than that they influence the amount of (some of) the background contributions, or the rate of change of this amount.

In embodiments of the present disclosure some non-specific bonds (which bind a background source against the surface 190) are much weaker than the specific bonds (or affinity bonds which bind the targets against the surface 190). Stimuli (e.g. pH, ionic strength, adding a detergent, changing the solvent (e.g. mixing some ethylene glycol or acetonitrile into the water)) that break the weak non-specific bonds (background) and not the specific bonds (signal) can be used to remove this part of the background.

Some non-specific bonds (e.g. hydrophobic interactions) are very strong, and will not be broken by the stimuli that are used to break the specific (affinity) bonds. Also other sources of background are not (or less) affected by such stimuli, such as scattering, autofluorescence of fixed centers in the device, etc. Stimuli that break the specific bonds (which generate the desired signal) and not the strong non-specific bonds (background) and other unaffected sources of background can be used to remove this part of the background. After breaking the specific bonds the measured signal is only a background signal. This background signal can be subtracted from the signal measured before the specific bonds were broken.

Modulations or stimulations with effect on the binding or immobilization of the desired and/or undesired events include pH, ionic strength, surfactants, solvents, temperature, etc.

In embodiments of the present disclosure the modulator 130 can modulate the rate at which the amount of luminescent targets increases. Instead of modulating the amount of bound material, i.e. by moving it on and off the sensor surface 190, the rate at which the target binds to the surface 190 may be modulated.

In one embodiment this is may be done by alternating the flow over the sensor surface 190 of the device 100 between flow of a liquid comprising the unknown concentration of the target, and a flow of a buffer without the target molecules or with a known concentration of target molecules. In example embodiments of the present disclosure, the association of the target continues for much longer before it saturates (even hours) than the accumulation of the background signals (which can reach saturation in e.g. minutes or seconds). This is especially the case when the targets are present at low concentration (where the signal-to-noise ratio is worst). In that case the association of the target continues for much longer before it saturates (even hours) than the accumulation of the background signals (which can reach saturation in e.g. minutes or seconds).

Hence, after the background signals have saturated, modulating the concentration of the target molecule (e.g. between unknown sample and zero) will modulate the slope of the accumulation curve. The difference in slope between accumulation with and without unknown sample can then be used to determine the target concentration in the unknown sample. In embodiments of the present disclosure the slope is obtained by comparing the slope measured in the presence of the known (for instance zero) concentration with the slope measured in the presence of the unknown concentration.

In embodiments of the present disclosure the slope is determined by measuring multiple times. This may be done by measuring continuously in real-time. Thereby, a plurality of measurements is obtained which allows to accurately determine the slope. In example embodiments, slope measurement is not sensitive to offsets or to any background signals which have already saturated.

In example embodiments, any remaining drifts and fluctuations in the device 100 can be eliminated as long as they are independent of the switch between unknown sample flow and reference flow. Such drifts and fluctuations can e.g. come from temperature drift or fluctuations in the setup, drift or fluctuations in the intensity of the excitation light, of the coupling efficiency of the fluorescent light into the detector, etc.

In embodiments of the present disclosure the buffer or reference flow with a known amount of target molecules or without target molecules has a similar composition as the unknown sample, such that the background signals themselves are changed as little as possible by the modulation. This can be achieved by making the matrix of the buffer solution similar to the matrix of the unknown sample; or also by adding the same or similar blocking agents to both the unknown sample and the buffer.

Figure 10:
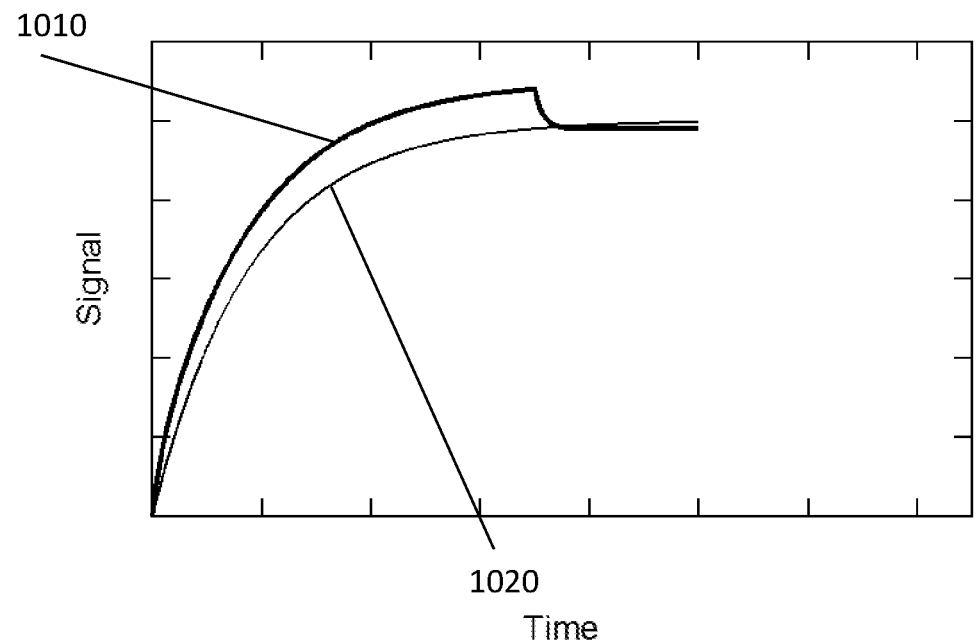
FIG. 10 shows a measured signal and a desired signal in an endpoint measurement in accordance with example embodiments.

In an exemplary embodiment of the present disclosure alternating the flow between sample and buffer is done as follows. In an assay, when the injection of the sample is started, there is typically also a change in the solution, e.g. from running buffer to the actual sample (e.g. serum) in which the target needs to be measured. This gives rise to additional background signals, such that the measured signal 1010, which is the desired signal plus the background signal, differs from the desired signal 1020, as shown in FIG. 10. In an endpoint measurement, one switches back to the running buffer and waits for the background signals to disappear before performing the actual measurement.

Figure 11:
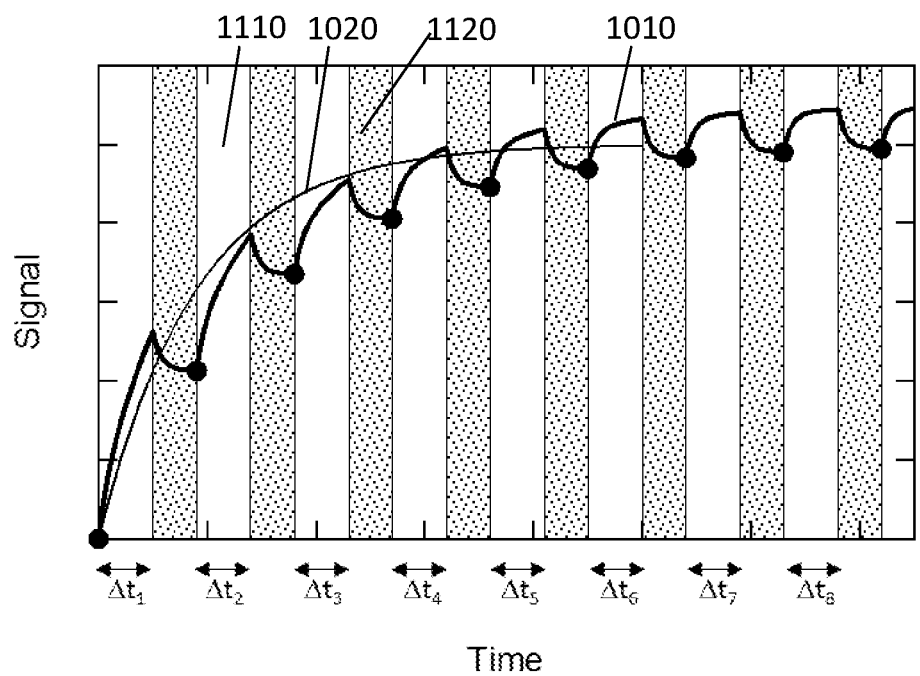
FIG. 11 shows the effect on the measured signal of alternating the buffer and sample, in accordance with example embodiments.
Figure 12:
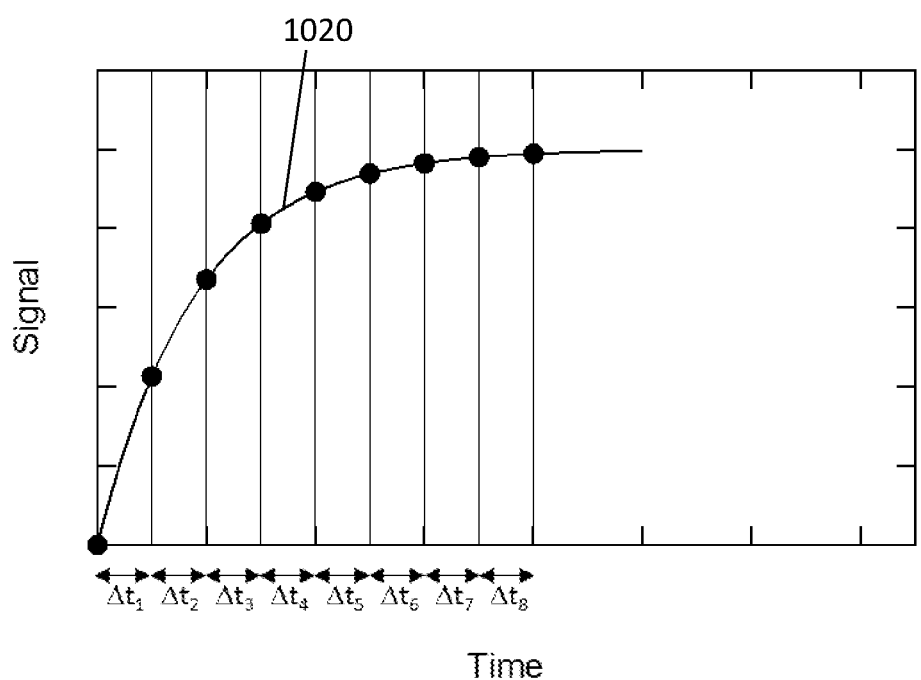
FIG. 12 shows the obtained desired signal in accordance with embodiments of the present invention.

In a real-time measurement, when one tries to follow the time evolution of the desired signal, the measurements would in fact give the time evolution of desired signal plus background signal. In embodiments of the present disclosure this problem is solved by switching back and forth between sample and running buffer as is illustrated in FIG. 11. The targets (plus label, in the case of pre-incubation), connect with the affinity probes and build up on the surface during the "white" intervals 1110 on the graph, and data points can be taken at the end of the "grey" intervals 1120 with buffer flow, when the background signals have vanished. By plotting these data points as a function of the total accumulation time (i.e., only taking into account the "white" intervals 1110 and not the "grey" ones 1120), the time evolution of the desired signal only, without the background contributions, can be reconstructed. This is illustrated by the curve in FIG. 12. In this way the elements of real-time measurements (faster time-to-result, better accuracy, better identification of unwanted trends or deviations from the desired protocol, e.g. identification of air bubbles in the sample) can be combined with the elements of endpoint measurements (e.g. wash steps that remove many of the parasitics or background signals).

Figure 9:
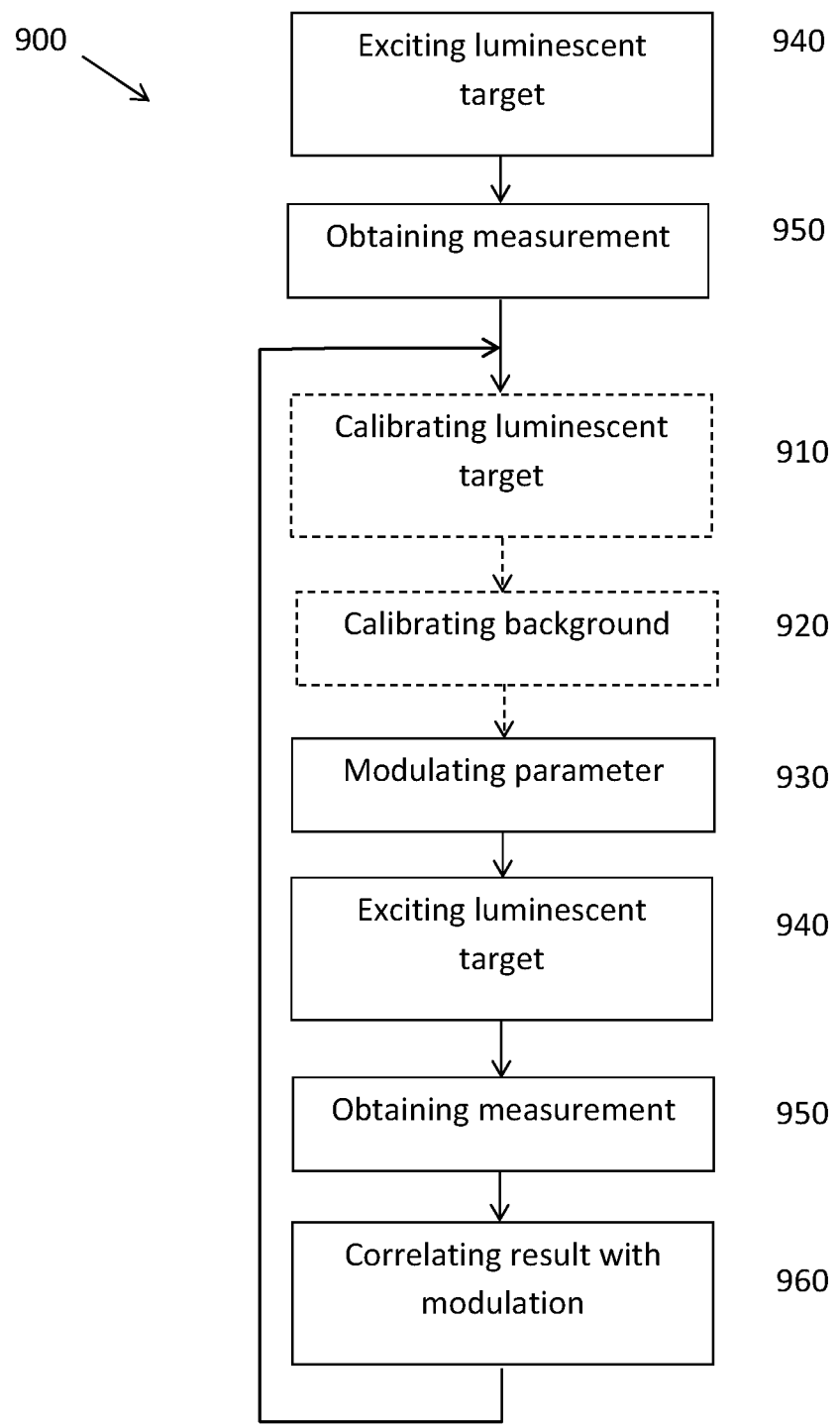
FIG. 9 shows different steps of a method in accordance with example embodiments.

In a second aspect, the present disclosure provides a method for quantifying luminescent targets. FIG. 9 shows the different steps of a method 900 according to embodiments of the present disclosure. Calibration steps 910, 920 are optional calibration steps. In step 910 the luminescence of the target is calibrated as a function of the modulation of the physical signal. In step 920 the dependency of the background signal is calibrated as a function of the modulation of the physical signal.

Embodiments of the present disclosure comprise a calibration step wherein the modulated physical signal is the temperature of the device. In this calibration step the temperature dependency of a system comprising only background signals and/or the temperature dependency of a system dominantly comprising the desired signal are measured. In embodiments of the present disclosure the signal to noise ratio can be increased by correlating these dependencies with the measured signal. The calibration data may be known a priori (e.g. a label with known temperature dependence, the temperature dependence of the background signal may be determined in the lab). The calibration data may be obtained at the start of a measurement (before the specific binding takes place). The calibration data may be obtained using a reference channel wherein no specific signal is present in the reference channel. In example embodiments, the calibration can be done in the reference channel while measuring the desired signal (together with the background signal) in another channel.

The calibration steps in the exemplary embodiment of FIG. 9 are followed by a modulation step 920 wherein the physical parameter, e.g. temperature, light, pH etc., is modulated. The modulation step 930 is followed by an excitation step 940 wherein the luminescent targets are excited and a detection step 950 for detecting the luminescent signal generated by the luminescent targets. The measurement results are correlated with the applied modulation in the correlating step 960. The correlating step may thereby take into account the (calibrated or known) dependency of the luminescence of the target on the modulation of the physical parameter and/or the (calibrated or known) dependency of the background signal on the modulation of the physical parameter. This sequence of steps is repeated at least once. From the measurement results which are correlated with the modulation of the parameter in the different passes, a measurement signal with improved signal to noise ratio is obtained.

Sensor devices 100 according to embodiments of the present disclosure may be used in bioreactors. Bioreactors are, for example, used in the pharmaceutical industry, in food and agriculture (e.g. beer), in cell and tissue culturing (e.g. stem cells, regenerative medicine). In those cases, (affinity-based) (bio)sensor devices 100, according to the present disclosure, can be used to monitor if the culture is performing fine (e.g. check nutrients, measure the concentration of a product the culture is fabricating, check for contaminations).

The invention claimed is:

1. A sensor device for quantifying luminescent targets, wherein the sensor device comprises:
    a light source configured to generate light that excites the luminescent targets to thereby cause the luminescent targets to generate luminescence signals;
    a detector configured to detect the luminescence signals of the luminescent targets and to output a detected signal that comprises a desired signal originating from the luminescent targets and a background signal;
    a modulator configured to adjust a physical parameter, wherein adjustment of the physical parameter changes the desired signal in a way that is different from a way in which the background signal changes, wherein the modulator is a light modulator and the physical parameter adjusted by the modulator is a wavelength of excitation light generated by the light source; and
    a processor configured to:
    control the modulator to adjust the physical parameter to different values; and
    correlate the different values associated with the physical parameter with changes in the desired signal and the background signal caused by the different values, so as to generate a measurement signal that facilitates quantification of the luminescent targets.

2. The sensor device according to claim 1, wherein the processor is adapted for taking into account a dependency of the luminescent signal of the target on the modulation of the physical parameter and/or a dependency of the background signal on the modulation of the physical parameter.

3. The sensor device according to claim 1, wherein the luminescent targets are fluorescent targets, and wherein the luminescence signals are fluorescence signals.

4. The sensor device according to claim 1, wherein the modulator is adapted for changing a temperature of the device.

5. The sensor device according to claim 1, wherein the light modulator is configured to change a power of excitation light generated by the light source.

6. The sensor device according to claim 1, for use with the luminescent target present in a liquid, wherein the modulator is adapted for changing a pH value of the liquid.

7. The sensor device according to claim 1, wherein the modulator is adapted for modulating an amount of luminescent targets contributing to the desired signal and/or an amount of sources contributing to the background signal.

8. The sensor device according to claim 7, wherein the modulator is adapted for modulating a rate at which the amount of luminescent targets binds.

9. The sensor device according to claim 1, the sensor device further comprising:
- a surface or a three-dimensional volume for binding the luminescent targets; and
- an evanescent field generating structure,
- wherein the light source is coupled to the evanescent field generating structure, and wherein the evanescent field generating structure is adapted for generating an evanescent field at the surface or in the three-dimensional volume.

10. A diagnostic device comprising:
the sensor device according to claim 1; and
an output unit for providing an output of the sensor device on which a diagnosis can be based.

11. The diagnostic device according to claim 10, wherein the output unit is configured to output a signal representative of presence/absence or concentration of an analyte.

12. The sensor device according to claim 1, wherein at least one of: the light source, the detector, the modulator, or the processor is configured for use with the luminescent targets, wherein the luminescent targets comprise photoswitchable labels.

13. A sensor device for quantifying luminescent targets, wherein the sensor device comprises:
- a light source configured to generate light that excites the luminescent targets to thereby cause the luminescent targets to generate luminescence signals;
- a detector configured to detect the luminescence signals of the luminescent targets and to output a detected signal that comprises a desired signal originating from the luminescent targets and a background signal;
- a surface or a three-dimensional volume for binding the luminescent targets;
- an evanescent field generating structure, wherein the light source is coupled to the evanescent field generating structure, and wherein the evanescent field generating structure is configured to generate an evanescent field at the surface or in the three-dimensional volume;
- a modulator configured to adjust a physical parameter, wherein adjustment of the physical parameter changes the desired signal in a way that is different from a way in which the background signal changes, wherein the modulator is a light modulator and the physical parameter adjusted by the modulator is a wavelength of excitation light generated by the light source; and
- a processor configured to:
- control the modulator to adjust the physical parameter to different values; and
- correlate the different values associated with the physical parameter with changes in the desired signal and the modulation of the background signal caused by the different values, so as to generate a measurement signal that facilitates quantification of the luminescent targets.

14. The sensor device according to claim 13, wherein the processor is adapted for taking into account a dependency of the luminescent signal of the target on the modulation of the physical parameter and/or a dependency of the background signal on the modulation of the physical parameter.

15. The sensor device according to claim 13, wherein the luminescent targets are fluorescent targets, and wherein the luminescence signals are fluorescence signals.

16. The sensor device according to claim 13, wherein the light modulator is configured to change a power of excitation light generated by the light source.

17. A diagnostic device comprising:
the sensor device according to claim 13; and
an output unit for providing an output of the sensor device on which a diagnosis can be based.

18. The diagnostic device according to claim 17, wherein the output unit is configured to output a signal representative of presence/absence or concentration of an analyte.

19. The sensor device according to claim 13, wherein at least one of: the light source, the detector, the modulator, or the processor is configured for use with the luminescent targets, wherein the luminescent targets comprise photoswitchable labels.

* * * * *